Dec. 8, 1959  E. M. AUCH  2,916,045
VALVE CONSTRUCTION
Filed April 11, 1956

INVENTOR.
ERNEST M. AUCH
BY
Walter Potoraka, Sr.
ATTORNEY

United States Patent Office 2,916,045
Patented Dec. 8, 1959

2,916,045

VALVE CONSTRUCTION

Ernest M. Auch, Detroit, Mich., assignor to Holley Carburetor Company, Van Dyke, Mich., a corporation of Michigan Application April 11, 1956, Serial No. 577,507

4 Claims. (Cl. 137—449)

This invention relates to valve structures, and more particularly to improvements in valves of the type wherein fluid must flow through a passage containing the valve body.

In certain valve applications, of which the fuel inlet valve in a carburetor float chamber is an example, the valve body is positioned for guided axial movement within an inlet passage containing the valve seat. One end of the valve is attached to the float member, and the other end of the valve has a suitable member such as a staked ball to engage the seat and close the inlet passage when the desired fuel level in the float chamber is reached. When the float drops due to a drop in fuel level, the valve moves away from the seat to permit fuel to flow through the passage in which the valve body is located and into the float chamber. In the past, this valve body has usually been constructed as a solid member having longitudinal external channels through which the fuel may flow past the valve body.

This solid valve body structure has been rather expensive, and the proper closing of the passage required that the staked ball or other valve seat-engaging member be concentric with the valve body or the passage within very close limits to prevent the leakage of fuel past the seat, which results in an excessive fuel level in the float bowl and faulty operation of the carburetor.

It is now proposed to provide a valve structure of this type which is very inexpensive to manufacture and which will insure complete closure of the passage.

Figure 1:
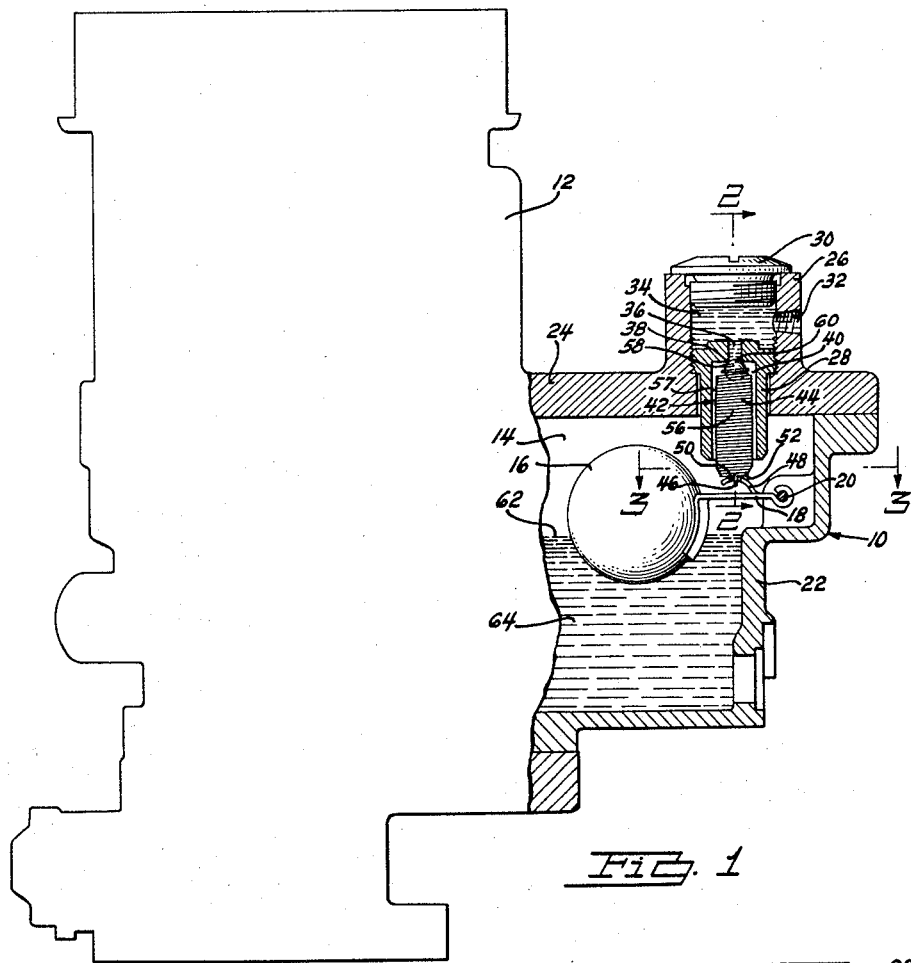
Figure 1 is a side elevational view of a carburetor embodying the invention, with portions thereof cut away and in cross section.

Referring to the drawings in greater detail, Figure 1 illustrates the usual fuel bowl assembly 10 of a carburetor 12, the details of construction of which are not important to the invention. The fuel bowl assembly 10 includes a float chamber 14 containing the usual float member 16 having attached thereto a float lever 18 which is pivoted at 20 to the fuel bowl 22. The fuel bowl 22 may be provided with a cover 24 having an internally threaded boss 26 adapted to receive the externally threaded inlet valve seat and guide member 28 and a cap screw 30. A fuel inlet passage 32 leads to the chamber 34 between the member 28 and the cap screw 30.

The valve seat and guide member 28 has a passage 36, the lower edge of which constitutes the valve seat 38 and an enlarged passage 40 adapted to receive and guide a valve assembly 42.

The valve assembly 42 comprises a coil spring valve body 44 having a hook portion 46 at one end thereof adapted to receive the arm 48 of the float lever 18. The arm may be slotted at 50 to receive and locate the hook portion 46, and the arm 48 is of sufficient thickness to extend between the end coil 52 of the spring 44 and the leg 54 of the hook 46 parallel to the end coil 52. The center portion 56 of the spring 44 may be of such diameter that it will fit in the passage 40 with sufficient clearance 57 so that fuel may pass between the outside of the spring 44 and the walls of the passage 40 and so that there will be no appreciable metal to metal contact to cause binding between them. The other end 58 of the spring 44 may be reduced in diameter and the coils thereof formed to receive and retain therein a ball 60 of any desired material and of sufficient diameter to engage the seat 38 and close the passage 36. The coils 58 retaining the ball 60 are preferably of reduced diameter so that fuel may enter and pass through the center of the spring 44, although this may not be necessary in some instances.

It should be noted that the coils 58 are preferably three in number, with the center coil being larger than the adjacent outer coils to form a cage adapted to receive a spherical body. The spherical body will be retained better if the coils 58 have to be slightly expanded to receive it. Of course, if the valve seat engaging body is some shape other than spherical, the coils 58 would be shaped differently.

It will be noted that when the fuel level 62 drops, the float 16 will also drop, causing the float lever 18 to pivot in a counterclockwise direction about the point 20. The arm 48 will pull the ball and spring assembly 42 downwardly so that the ball 60 is moved away from the seat 38 and fuel may pass through and around the spring 44 and into the float chamber 14. As the fuel level 62 rises, the float 16 will rise and the valve assembly 42 will close the passage 36 so that fuel cannot enter.

It is apparent that with the above spring construction of the valve 42, the ball 60 need not be perfectly concentric with the spring 44 because it is free due to the spring construction to seek a seated position in case of initial misalignment. The same will occur if foreign matter should become lodged in the clearance 57 or elsewhere in the passage 40. This spring construction is obviously an important feature of the invention.

Figure 2:
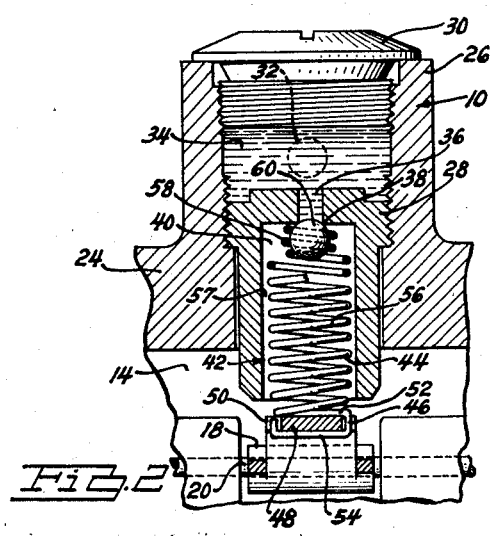
Figure 2 is an enlarged fragmentary cross-sectional view taken on the plane of line 2—2 of Figure 1 illustrating a modification of the invention.
Figure 3:
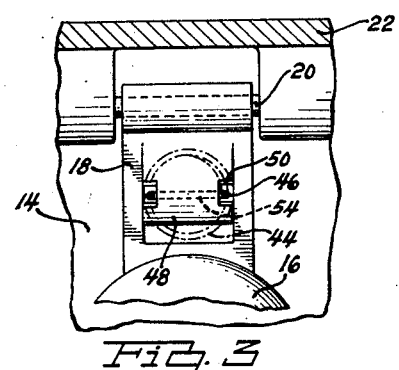
Figure 3 is a fragmentary plan view taken on the plane of line 3—3 of Figure 1.

The fuel in chamber 34 is under pressure, and when the fuel in the float chamber 14 is at proper level the fuel in chamber 34 must not be permitted to flow through the passage 36. Otherwise, the flow of fuel through the carburetor nozzles will be excessive. It is therefore apparent that several constructions of the coil spring valve body 44 are possible. One construction is to provide a close-wound coil such as that shown by Figure 1 in which the coils are in contact with one another. This could be so even in the free position of the spring when the passage 36 is open. Another construction would be to provide an open-wound spring which is compressed to a close-wound spring when the ball is seated, as shown by Figure 1. A third construction is to provide an open-wound spring such as that shown by Figure 2 having a force greater than the force of the fuel on the ball 60.

The proposed valve construction provides a valve which in this type of application, whether it be in a carburetor or some other device, provides an effective seal regardless of misalignment of the valve body. In addition, this valve construction is very inexpensive to make and assemble. The coil spring valve body is merely wound to the desired shape and specification, and the ball is forced into the smaller coils which are formed to extend on opposite sides of a plane passing through the center of the ball and to provide a cage to retain it. If the ball becomes damaged it can easily be removed and a new one inserted, thus salvaging the spring.

The drawings and the foregoing specification constitute a description of the improved valve structure in such full, clear, concise and exact terms as to enable any person skilled in the art to practice the invention, the scope of which is indicated by the appended claims.

What is claimed is:

1. In a carburetor, the combination of a constant level fuel chamber, a fuel inlet to said chamber, said fuel inlet having a valve seat therein, a valve in said fuel inlet, and a float member controlling the position of said valve, said valve comprising a valve seat engaging member and a wound wire spring having one end thereof engaging said float member, the other end of said spring being itself formed to provide a resiliently expansible cage adapted to retain said valve seat engaging member therein, said member being urged against said seat to close said fuel inlet when said float member is raised by the fuel in said chamber.

2. In a carburetor, the combination of a constant level fuel chamber, a fuel inlet to said chamber, said fuel inlet having an annular valve seat therein, a two-piece valve assembly in said fuel inlet, and a float member controlling the position of said valve assembly, said valve assembly comprising a spherical valve seat engaging member and a close wound coil spring having one end thereof secured to said float member, the other end of said spring being itself formed to provide an integral three-coil resilient cage adapted to receive and hold said spherical member therein, said spherical member being urged against said valve seat to close said fuel inlet when said float member is raised by the fuel in said chamber.

3. In a carburetor, the combination of a constant level fuel chamber, a fuel inlet to said chamber, said fuel inlet having an annular valve seat therein, a two-piece valve in said fuel inlet on the downstream side of said seat, and a float member controlling the position of said valve, said valve comprising a spherical valve seat engaging member and a coil spring having one end thereof secured to said float member, the end coils at the other end of said spring being formed to provide a three-coil resilient cage adapted to receive and hold said spherical member therein, said spherical member being urged against said seat to close said fuel inlet when said float member is raised by the fuel in said chamber.

4. In a carburetor, the combination of a constant level fuel chamber, a fuel inlet to said chamber, said fuel inlet having an annular valve seat therein, a valve assembly in said fuel inlet on the downstream side of said seat, and a float member controlling said valve assembly, said valve assembly comprising a spherical seat engaging member and a coil spring having one end thereof secured for movement with said float member, the other end of said spring having the coils thereof formed to provide a multiple coil cage having a free diameter less than the diameter of said spherical member and adapted to independently retain said spherical member when the latter is passed into said cage, said cage permitting without permanent deformation thereof the repeated insertion and removal of said spherical member.

References Cited in the file of this patent

UNITED STATES PATENTS

| | | |
|---|---|---|
| 1,296,897 | Yeomans | Mar. 11, 1919 |
| 1,602,647 | Carr | Oct. 12, 1926 |
| 1,783,891 | Thibert | Dec. 2, 1930 |
| 2,400,817 | Fox et al. | May 21, 1946 |
| 2,440,608 | Hunter | Apr. 27, 1948 |
| 2,584,716 | Koppel | Feb. 5, 1952 |
| 2,752,937 | Hieger | July 3, 1956 |